Jan. 21, 1964 A. L. MILLER 3,118,600
CONTINUOUS FLOW FLUID HEATER CONTROL
Filed Aug. 28, 1961
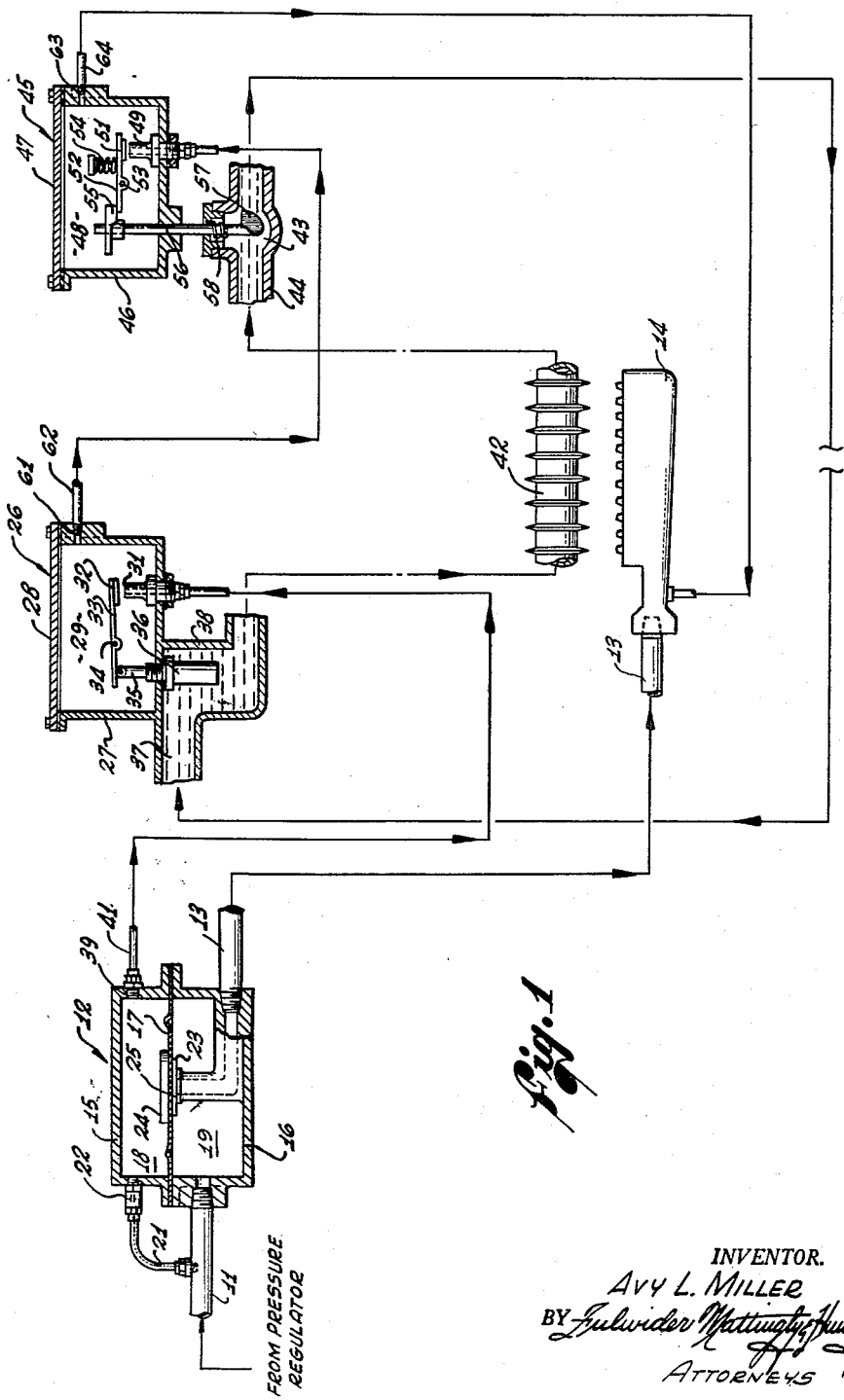
INVENTOR.
AVY L. MILLER
BY
ATTORNEYS

United States Patent Office 3,118,600
Patented Jan. 21, 1964

3,118,600
CONTINUOUS FLOW FLUID HEATER CONTROL
Avy L. Miller, 13246 Saticoy St., North Hollywood, Calif.
Filed Aug. 28, 1961, Ser. No. 134,465
6 Claims. (Cl. 236—23)

The present invention relates generally to the control of fluid heaters, and more particularly to the control of water heaters of the continuous flow type.

In continuous flow fluid heaters, heat is applied to the fluid from the products of combustion of gas or oil supplied from suitable burners, while the fluid is passed through heat exchange tubes or coils, or similar heat exchange elements. The supply of heating gas or oil to the burner is preferably controlled in accordance with the temperature of the incoming fluid to initiate starting and stopping of combustion, and not as a mere incident to the flow of fluid through the heater.

In the operation of continuous flow water heaters for heating swimming pools, for example, the heater is ordinarily connected in the water circulatory path through the pool filter, so that water withdrawn from the pool to be filtered and returned thereto will pass through the heater tubes even when the water is at an elevated temperature at which no heating thereof is desired. Should the pool water temperature fall, a thermostat operating a switch or valve will call for heat and will initiate supply of fuel to the heater burner. This apparatus for water heating is thereby distinct from the so-called "instantaneous heaters" wherein initiation of flow of water through the heater each time a tap is opened initiates combustion of fuel in the heater.

For one reason or another, such as plugging of the circulatory system or failure of the pump, water may not be flowing through the heater when the thermostat calls for heating of the water. When combustion is started under this condition, the temperature of the water within the tubes will be raised to dangerous levels at which steam may form and cause a pressure explosion or, if there is no water present in the heater tubes, they and other parts of the heater may be damaged by the excessive heat. Since the thermostat is ordinarily located remote from the heat exchange tubes of the heater, it will continue to call for combustion.

It is an object of the present invention to remove the possibility of this dangerous condition occurring by preventing the supply of combustion fuel unless water is flowing through the heater, thereby preventing overheating of water in the heater tubes and/or damage to the heater parts.

Another object of this invention is the provision of a combined thermostatic and flow control for fluid heaters operating in series relation.

Another object of this invention is the provision of a fuel supply control for fluid heaters having desirable safety features.

A further object of this invention is the provision of a fuel supply control for continuous flow water heaters supplying combustion fuel thereto only when the water is below a predetermined temperature and is flowing through the heater.

Yet another object of this invention is the provision of an improved temperature and flow responsive valve system for the supply of combustion fuel to a continuous flow water heater.

These and other objects and features of this invention will be readily apparent to those skilled in the art from the following specification and the appended drawing of a presently preferred embodiment, in which:

FIGURE 1 is a schematic representation of a fuel control system for a continuous flow fluid heater according to the present invention.

The fluid heater system according to the present invention is specifically illustrated in FIGURE 1 for the supply of gaseous fuel, but it will be obvious from the following description that the system may also be adapted for the supply of liquid fuel, such as furnace oil. Gaseous fuel from a pressure regulator is fed through a supply pipe 11 to a main control valve 12, whence it is conducted through a conduit 13 to a conventional burner 14. The main control valve 12 is made up of a pair of casing sections 15 and 16 having a flexible diaphragm 17 therebetween sealing the interior of the valve into two chambers 18 and 19. Supply pipe 11 leads directly into the chamber 19. Gas at supply pressure is fed through a branch conduit 21 and a restricted orifice 22 into the chamber 18. Rigidly mounted on the diaphragm 17 as by clamping it therebetween are a valve sealing plate 23 and a weight 24. The valve plate 23 cooperates with an exit valve opening 25 to seal the same and prevent flow of gas from the chamber 19 to the conduit 13. With no exit from the chamber 18, the pressure therein is at the same value as the pressure in the chamber 19 and the valve 12 is closed, since the effective area above the diaphragm 17 is greater than that below by the area of the valve outlet 25. The weight 24 assists in closing the valve.

A thermostatic control valve 26, comprised of a casing 27 and a cover 28, provides a gastight chamber 29. Within the chamber 29 is disposed a stationary valve element 31 and a cooperating movable valve element 32 mounted upon an arm 33 having a fixed pivot at 34. Pivotally connected to the end of arm 33 is the operator 35 of a thermostatic element 36 in contact with the incoming water 37 in conduit 38. Casing 15 is provided with an outlet 39 and tubing 41 connects the outlet 39 to the valve element 31 within the chamber 29.

The water 37 from the passage 38 passes through heat exchange tubes indicated generally at 42 and then through a flow chamber 43 within a pipe 44.

A flow responsive valve 45 includes a casing 46 and a cover 47 sealably attached thereto, and forming a gastight chamber 48. Within the chamber 48 is mounted a stationary valve element 49 and a movable valve element 51 cooperating therewith. The valve element 51 is mounted on an arm 52 which is pivoted at 53 and biased into valve closing position by a spring 54. A valve operator is provided by a rotary cam 55 mounted on a shaft 56 and bearing on the end of the arm 52. The lower end of the shaft 56 extends into the flow chamber 53 where it supports a paddle 57 and is biased by a spring 58 toward the position permitting the valve 45 to be closed by the spring 54. The casing 27 is provided with an outlet 61 and tubing 62 connects the outlet 61 to the valve inlet 49 in the chamber 48. The casing 46 is provided with an outlet 63 and tubing 64 leads from this outlet to the burner 14.

The operation of the heater control system according to the present invention will now be described. The passage 38, the heat exchanger 42 and the conduit 44 are serially connected so that the water 37 flows therethrough in series. In the heating of fluids generally this flow might be induced by any means, and in the case of swimming pool heaters is preferably effected by means of a pump which circulates pool water through the water heater and a filter and returns warmed, filtered water to the pool. As the water or other fluid passes through the chamber 43, it will exert a force on the paddle 57, rotating shaft 56 against the bias of spring 58 to place the rotary cam 55 in the position illustrated in FIGURE 1, where it causes the valve element 51 to move away from the valve element 49 and open the valve 45.

Unless the water in the passage 38 is at a low enough temperature to call for heating, as determined by the setting of the thermostatic element 36, the opening of the flow responsive valve 45 has no effect. However, should the temperature of the water or fluid be sufficiently low to call for heating thereof, the operator 35 is retracted to rotate the arm 33 counterclockwise whereupon the valve element 32 moves away from the valve element 31 to open the control valve 26. This permits gas to flow from the chamber 18 through the outlet 39, tubing 41, valve element 31 to chamber 29, from which it flows through outlet 61, tubing 62 and valve element 49 to the chamber 48; and thence through outlet 63 and tubing 64 to the burner 14. This flow of gas from the chamber 18 lowers the pressure therein since the supply of gas to the chamber 18 is limited by the restricted orifice 22. With the lowering of the pressure in the chamber 18, the force on the diaphragm 17 at the lower side becomes greater and the diaphragm and valve sealing plate 23 move upwardly, opening the valve outlet 25 from the chamber 19. The main gas control valve 12 being thus opened, gas will flow from the conduit 11 through chamber 19, gas outlet 25 and conduit 13 to the burner 14 where it may be ignited by any conventional means, such as a pilot flame or an electrical spark.

If at any time the flow of water or other fluid through the heat exchanger 42 should stop, no force will be exerted on the paddle 57 and the spring 58 will rotate the shaft 56 to release the end of arm 52 and permit the valve element 51 to close the valve 45 under the bias of the spring 54. This closes the passage which exhausts gas from the chamber 18 so that, regardless of the position of the thermostatic control valve 26, pressure will be maintained within the chamber 18 and the main control valve 12 will be closed. This may occur while the gas is flowing to the burner 14, in which case it will operate to shut off the flow of gas and terminate combustion; or it may occur while the thermostatic valve 26 is closed, in which case subsequent opening of the valve 26 will be without effect.

Thermostatic control valve 26 and flow responsive control valve 45 are serially connected and operate in AND fashion wherein both must be opened before gas will flow through the main fuel control valve 12 to the burner 14; therefore closing of either the thermostatic valve or the flow responsive valve shuts off and/or prevents opening of the main control valve 12. Thus the flow responsive valve 45 constitutes a safety which at all times prevents combustion within the fluid heater unless fluid is flowing through the heater, and, in carrying out this function, it overrides a signal from the thermostatic control valve calling for combustion.

It is therefore seen that the present invention provides a heater for fluids which normally flow continuously through the heater during the heating operation, in which the control of combustion within the heater is normally in response to the temperature of the incoming fluid but in which an overriding control is provided so that, regardless of the signal from the temperature responsive control, no fuel will be supplied to the heater unless the fluid to be heated is actually flowing therethrough.

Also, it will be seen that in the operation of swimming pools where circulation of the water for filtering and heating is periodic rather than continuous, no other controls need be provided to prevent heating during periods of noncirculation of water, since at these times the flow responsive valve will be closed. In this respect the system and control according to the present invention permits over-all simplification of the heater control as well as supplying the safety feature of fuel cutoff upon stoppage of water flow.

It will be understood that the system and control according to the present invention may be combined with other controls, such as thermostatic switches and solenoid valves, and otherwise modified, and that while a certain preferred embodiment of the invention has been schematically illustrated in the drawing and described in the specification, it will be understood that the invention is not limited thereto, as many variations will be apparent to those skilled in the art, and the invention is to be given its broadest interpretation within the terms of the following claims.

I claim:

1. Safety fuel control for a continuous flow fluid heater comprising: a recirculatory fluid system including a heater for heating fluid in the system; means controlling the supply of fuel to the heater; normally operating means responsive to the temperature of the fluid prior to its entrance into the heater for actuating said fuel control means; and abnormally operating, safety means responsive to cessation of flow of fluid through the heater for actuating said fuel control means, said abnormally operating, flow responsive safety means being connected to prevent operation of said fuel controlling means to supply fuel to the heater after stopping of fluid flow, regardless of said temperature responsive means calling for fuel to be supplied.

2. A continuous flow fluid heater comprising: a recirculating fluid system including a heat exchanger; means for passing a fluid to be heated through said system and heat exchanger; a burner for fuel supplying products of combustion in heat transfer relation with said heat exchanger; means controlling the supply of fuel to said burner; normally operating, primary control means responsive to the temperature of the fluid prior to its entrance into said heat exchanger for normally controlling said fuel controlling means to supply fuel to the burner when the temperature of the incoming fluid is below a predetermined value; abnormally operating, safety control means responsive to cessation of flow of fluid through the heat exchanger for abnormally cutting off the supply of fuel by said fuel controlling means to protect against overheating; and means serially connecting said primary temperature responsive control means and safety flow responsive control means so that both must signal for supply of fuel before fuel is supplied to the burner by said fuel controlling means.

3. A continuous flow fluid heater comprising: a recirculatory fluid system including a heat exchanger; means passing fluid to be heated through said system and heat exchanger; a burner for fuel supplying products of combustion in heat transfer relation with said heat exchanger; a valve controlling the flow of fuel to said burner; normally operating, primary control means responsive to the temperature of said fluid prior to its entrance into the heat exchanger for normally effecting opening of said valve when the temperature of the fluid lowers to a predetermined value; and abnormally operating, safety control means responsive to cessation of flow of fluid through said heat exchanger for preventing opening of said valve unless fluid is flowing through the heat exchanger to protect against overheating.

4. A continuous flow fluid heater comprising: a recirculatory fluid system including a heat exchanger; means passing fluid to be heated through said system and heat exchanger; a burner for fuel supplying products of combustion in heat transfer relation with said heat exchanger; a main valve controlling the supply of fuel to the burner and having a bleed chamber whose opening effects opening movement of the valve; a normal control valve controlling the opening of said bleed chamber; means responsive to the temperature of the fluid prior to its entrance into the heat exchanger for normally controlling said normal control valve; a safety valve controlling the outlet from said normal control valve and operable when closed to defeat the opening of said normal control valve by closing said outlet; and means responsive to cessation of flow of fluid through the heat exchanger for closing said safety valve to protect against overheating.

5. A continuous flow fluid heater comprising: a recirculatory fluid system including a heat exchanger; means passing fluid to be heated through said system and heat exchanger; a burner for fuel supplying products of combustion in heat transfer relation with said heat exchanger; a main diaphragm valve controlling the supply of fuel to said burner; a bleed chamber above said diaphragm controlling the position thereof; a normal control valve and a safety control valve controlling the bleed passage from said chamber to control the operation of the main valve; primary operating means responsive to the temperature of the fluid prior to its entrance into the heat exchanger for normally operating said normal control valve to effect opening and closing of said main valve to supply fuel in accordance with fluid temperature; and secondary operating means responsive to cessation of flow of fluid through the heat exchanger for abnormally closing said safety control valve to close said main valve to protect the heat exchanger against overheating.

6. A continuous flow fluid heater comprising: a recirculatory fluid system including a heat exchanger; means passing fluid to be heated through said system and heat exchanger; a burner for fuel supplying products of combustion in heat transfer relation with said heat exchanger; a main diaphragm valve controlling the supply of fuel to said burner; a bleed chamber above said diaphragm controlling the position thereof; a normal control valve and a safety control valve controlling the bleed passage from said chamber to control the operation of the main valve; primary operating means responsive to the temperature of the fluid prior to its entrance into the heat exchanger for normally operating said normal control valve to effect opening and closing of said main valve to supply fuel in accordance with fluid temperature; and secondary operating means responsive to cessation of flow of fluid through the heat exchanger for abnormally closing said safety control valve to close said main valve to protect the heat exchanger against overheating, said pair of control valves being connected in series so that both must be open to effect opening of the main fuel control valve.

References Cited in the file of this patent

UNITED STATES PATENTS

| | | |
|---|---|---|
| 1,636,770 | Fox et al. | July 26, 1927 |
| 2,244,910 | Hartmann | June 10, 1941 |
| 2,291,023 | Burklin | July 28, 1942 |
| 2,950,755 | Frecourt | Aug. 30, 1960 |